(12) United States Patent
Landoll et al.

(10) Patent No.: US 7,992,650 B2
(45) Date of Patent: Aug. 9, 2011

(54) AIR SPRING DOWN-PRESSURE SYSTEM FOR IMPLEMENT

(75) Inventors: Donald R. Landoll, Marysville, KS (US); Allan S. Gengler, Beloit, KS (US)

(73) Assignee: Landoll Corporation, Marysville, KS (US)

(*) Notice: Subject to any disclaimer, the term of this patent is extended or adjusted under 35 U.S.C. 154(b) by 60 days.

(21) Appl. No.: 12/500,508

(22) Filed: Jul. 9, 2009

(65) Prior Publication Data

US 2011/0005784 A1    Jan. 13, 2011

(51) Int. Cl.
*A01B 61/04* (2006.01)
(52) U.S. Cl. .................................... 172/260.5
(58) Field of Classification Search ............. 172/260.5, 172/261, 263, 264, 265, 497, 500; 111/118, 111/151
See application file for complete search history.

(56) References Cited

U.S. PATENT DOCUMENTS

| | | | |
|---|---|---|---|
| 220,526 A * | 10/1879 | Gardiner | 172/266 |
| 3,042,122 A * | 7/1962 | Anderson | 172/260.5 |
| 3,277,967 A * | 10/1966 | Weispfenning | 172/705 |
| 4,353,423 A * | 10/1982 | Poggemiller et al. | 172/260.5 |
| 5,462,123 A | 10/1995 | Harlan | |
| 5,787,988 A | 8/1998 | Harlan | |
| 6,324,775 B1 * | 12/2001 | Harnois et al. | 37/266 |
| 6,389,999 B1 * | 5/2002 | Duello | 111/200 |
| 6,792,704 B2 * | 9/2004 | Johnson | 37/235 |
| 6,986,313 B2 * | 1/2006 | Halford et al. | 111/186 |
| 7,395,767 B2 * | 7/2008 | Sulman | 111/55 |
| 7,575,066 B2 * | 8/2009 | Bauer | 172/540 |
| 2006/0065412 A1 * | 3/2006 | Bauer | 172/150 |

* cited by examiner

*Primary Examiner* — Robert E Pezzuto
*Assistant Examiner* — Matthew D Troutman
(74) *Attorney, Agent, or Firm* — Mark E. Brown; Law Office of Mark Brown, LLC (57) ABSTRACT

An implement with a ground working tool mounted on an arm pivotably movable between raised and lowered positions includes a pneumatic down pressure control system. The down pressure control system includes upper and lower mounts with an air spring located between them and having compressed and extended configurations with said arm raised and lowered respectively. A parallel plate mechanism maintains the upper and lower mounts in parallel relation and maintains a relatively consistent down pressure of the air spring. Multiple air springs can be provided on an implement and pneumatically interconnected by an air line for simultaneously charging to a constant air pressure.

18 Claims, 8 Drawing Sheets

AIR SPRING DOWN-PRESSURE SYSTEM FOR IMPLEMENT

BACKGROUND OF THE INVENTION

1. Field of the Invention

The present disclosed technology relates generally to suspension systems, and in particular an air spring down-pressure system for an agricultural implement.

2. Description of the Related Art

Agricultural implements that work the soil require mechanical force to penetrate down into the soil and move forward through the soil. Typically, penetrating force, also referred to as down pressure, is generated by the weight of the implement and mechanical force created by a suspension system using helical or leaf springs.

Grain drills, also referred to as openers, are agricultural tilling implements that allow farmers to quickly and efficiently plant row crops using agricultural machinery. Openers are independent units attached to a structure, such as a tool bar, which is pulled behind a tractor. Multiple openers are usually attached to a tool bar and spaced apart at specific intervals. As the opener moves forward, it plants seeds in the soil by penetrating and separating the soil with a pair of overlapping discs to create a trench in which a seed is deposited. Additional furrow-closing components flank the discs and trail behind them for returning the soil to the open furrow or trench and for covering the deposited seeds.

The depth of the trench created by the discs depends upon the condition of the soil, the amount of residue present, the opener and the amount of down pressure exerted by the opener against the ground. Down pressure is created using a suspension system that generates mechanical force to bias the opener discs down. Conventional openers typically have suspension systems with springs for exerting down pressure. However, due to the spring constant factors associated with mechanical springs, down pressure from spring action varies over the range-of-travel, with greater forces being exerted at full compression/extension conditions. Moreover, the mechanical linkages and pivot points associated with springs tend to increase problems associated with operating and maintaining such spring-based conventional implement suspension systems, still further, because of the mechanical geometries of spring-based suspension systems, they are vulnerable to contamination from soil and residue displaced during the planting process. Other disadvantages include lack of adjustability and frequency of repairs and maintenance.

What is needed is a suspension system with fewer moving parts and pivot points than conventional systems, which has fewer wear points, which provides more consistent down pressure throughout its vertical travel, and which permits infinite down pressure adjustment from a single control point. Heretofore there has not been available a suspension system with the advantages and features of the disclosed subject matter.

BRIEF SUMMARY OF THE INVENTION

In a suspension system embodying the principles of the disclosed subject matter, an air spring assembly disposed between upper and lower mounts provides consistent and adjustable down pressure on the arm of an agricultural implement by keeping the mounts parallel to each other using a guide rod. An upper mount is pivotally connected to a pivot point at one end of the implement arm, and a lower mount is pivotally connected to a pivot point on the arm located rearward of the end pivot point. The upper and lower mounts each contain an elongated aperture and an adjacent hole. A sleeve type air spring is secured within the apertures permitting repositioning between front and rear aperture locations. A guide rod secured within the lower mount hole extends up and through a wear bushing located within the upper mount hole.

In operation, as the upper and lower mounts move toward or away from each other, the guide rod slides within the wear bushing, keeping the upper and lower mounts in a parallel relationship as the air spring provides consistent down pressure upon the implement arm.

The amount of down pressure exerted by the suspension system upon the arm can be adjusted by varying the air pressure within the air spring, by moving the air spring assembly forward or backward within the apertures, or both. The air springs are connected to a source of air pressure such as an air compressor. Moving the air spring assembly in a rearward position within the apertures creates a longer distance between the pivot point at the end of the arm and the pivot point of the bottom plate, thereby decreasing the mechanical advantage of the arm and increasing the relative down pressure of the suspension system. Conversely, moving the air spring assembly forward in the apertures increases the mechanical advantage of the arm and decreases the relative down pressure of the suspension system upon the arm. For example, field conditions may necessitate greater down pressure in opener assemblies to accommodate hard ground conditions, field debris and similar conditions associated with greater opener resistance. Moreover, selective opener assemblies, such as those following the tractor wheels and encountering compacted soil conditions, may require greater down pressure for constant-depth furrows.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENT

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Embodiment of the Suspension System 2

Figure 1:
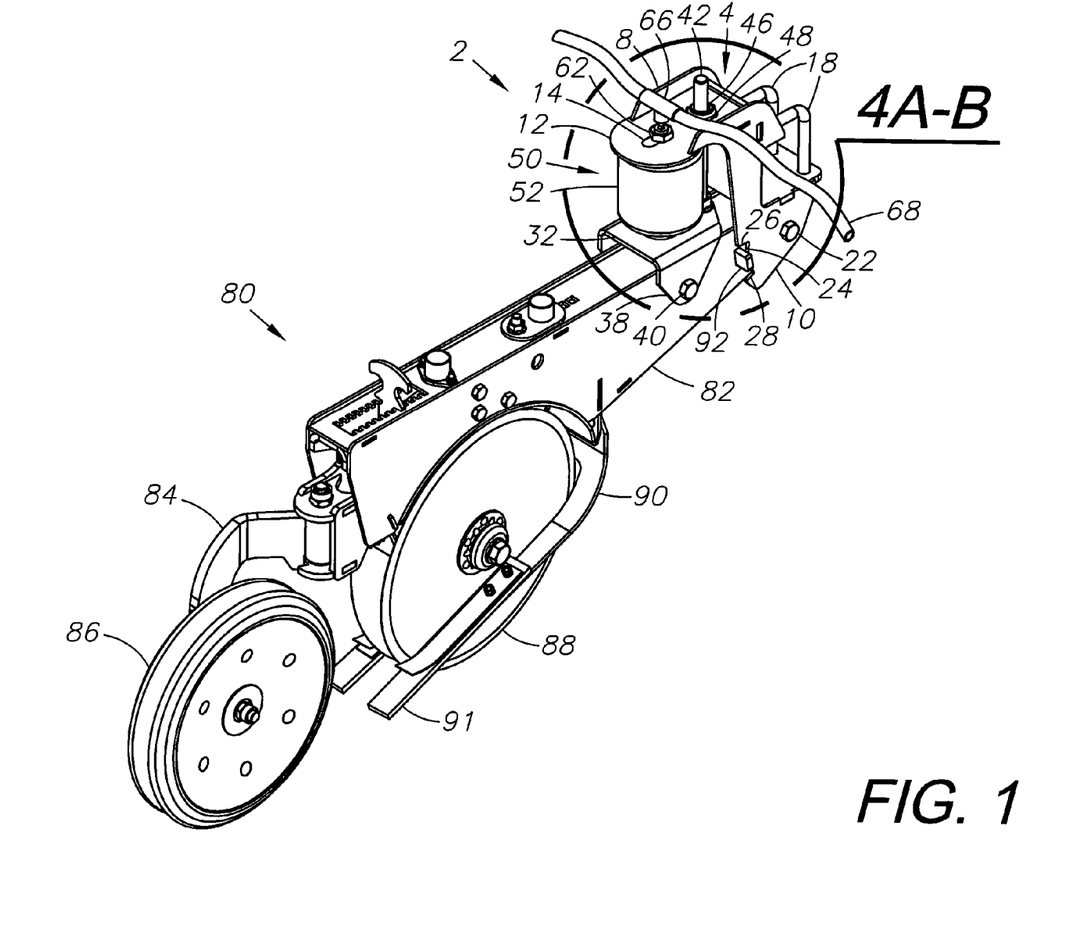
FIG. 1 is an upper, right, rear perspective view of an air spring suspension system embodying the principles of the disclosed subject matter.
Figure 2:
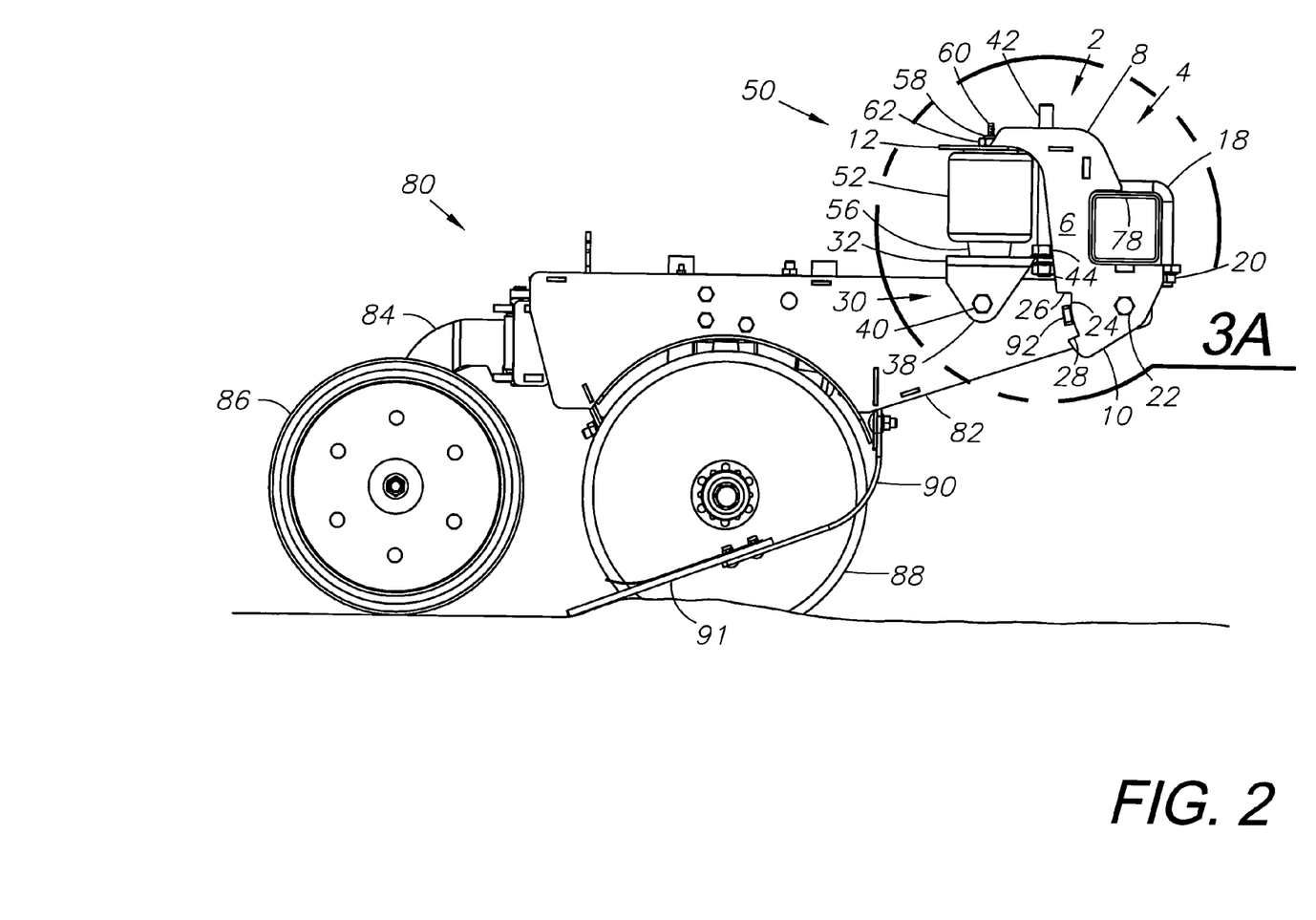
FIG. 2 is a right side elevational view of the air spring suspension system.

Referring to the drawings in more detail, the reference numeral 2 generally designates a suspension system embodying the principles of the disclosed subject matter. Referring to FIGS. 1-2, an embodiment of the suspension system 2 is shown in use with an agricultural implement, specifically an opener assembly 80 for depositing seeds in the soil. The opener assembly 80 generally consists of a rearwardly extending arm 82 having a box-like construction, mounting a press wheel 86 on a trailing arm 84, and mounting a pair of opener discs 88 flanked laterally by a soil compactor subassembly 90 including a pair of compactor blades 91 straddling the discs 88. The opener assembly 80 is designed to be secured at the front end to a tool bar 78 by the suspension system 2. The tool bar 78 extends laterally behind a tractor or other suitable farm machinery. The suspension system 2 generally operates by biasing the opener assembly 80 against the tool bar 78 forcing the pair of slightly overlapping opener discs 88 down into the soil causing lateral displacement of the soil, and creating a furrow or trench in which the seeds are deposited. As the opener assembly 80 moves forward, the seeds are deposited and the displaced soil is returned to the furrow by the soil compactor 90 and the trailing press wheel 86.

Figure 3A:
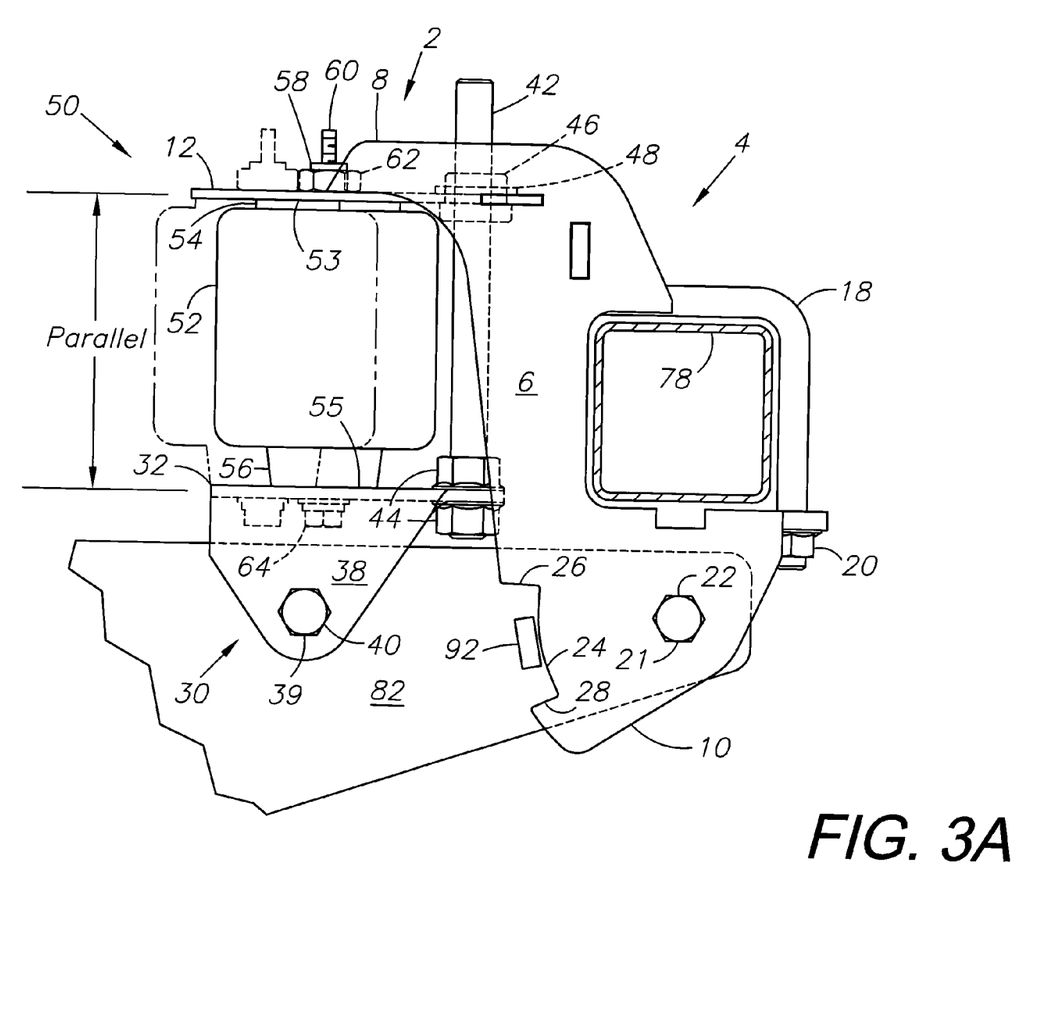
FIG. 3A is an enlarged, fragmentary elevational view of the air spring suspension system taken generally within circle 3A in FIG. 2 and shows the air spring in a neutral condition.

Referring to FIG. 3A, the suspension system 2 consists of an air spring assembly 50 and a guide rod 42 disposed between a base bracket or lower mounting 30 and a tool bar bracket or upper mount 4. The upper mount 4 is fabricated from steel and has opposite sidewalls 6 with arms 8 extending rearwardly from an upper portion, and legs 10 depending from the bottom. An upper plate 12 extends rearwardly from the upper portion of the sidewalls 6 beyond the back end of the arms 8. The upper plate 12 has a slotted aperture 14 for receiving the threaded neck 58 of the air spring 52, and a hole (not shown) for attachment of a tubular wear bushing 46. The forward portions of the side walls 6 partially circumscribe the tool bar 78 by contacting the rear, upper and lower surface of the tool bar 78. Generally L-shaped fasteners 18 demountably secure the upper mount 4 to the tool bar 78 by nuts 20. The legs 10 straddle the forward portion of the opener assembly arm 82, which is pivotally mounted thereto at a first pivot 21 by a fastener 22, such as a bolt. At the rear of each leg 10 a rectangular tab 92 that protrudes perpendicular from each sidewall of the arm 82 permitting rotation of the arm 82 about the bolts 22 between upper and lower stops 26, 28 located within a recess 24.

A metal base bracket or lower mount 30 disposed above the arm 82 consists of a lower plate 32 and sidewalls 38 depending therefrom that astride the arm 82. The lower mount 30 is pivotally affixed to the arm 82 at a second pivot 39 by fasteners 40, such as bolts, that extend through the sidewalls 38 and into the arm 82. The lower plate 32 has an aperture 34 at its rear portion receiving a bolt 64 for securing the air spring assembly 50 thereto, and a hole (not shown) at a forward end for receiving the threaded end of the guide rod 42.

The air spring assembly 50 consists of a sleeve type air spring 52 with an upper or first end 53 and a lower or second end 55 composed of a flexible reinforced rubber sleeve disposed between a bead plate 54 at the top, and a lower end dome 56 at the bottom. The upper portion of the air spring assembly 50 is secured to the upper plate 12 by positioning the threaded neck 58 of the valve 60 protruding from the top of the bead plate 54 in the aperture 14 of the upper plate 12 and securing a nut 62 on the threaded neck 58. The lower portion of the air spring assembly 50 is secured against the lower plate 32 by a bolt 64 threadably received within a blind nut (not shown) disposed within the lower end of the dome 56. A threaded guide rod 42 is secured within the passage (not shown) of the lower mount 30 with nuts 44 and extends upwardly through a tubular wear bushing 46 disposed within a hole (not shown) in the upper plate 12. The wear bushing 46 is manufactured from a Nylatron® material and is threadably secured within the hole (not shown) by a ring nut 48.

III. Operation

The suspension system 2 provides consistent down pressure upon the opener assembly 80 because the air spring assembly 50 is mounted to two parallel surfaces. Furthermore, the amount of down pressure created by the suspension system 2 can be increased or decreased by adjusting the air pressure within the air spring 52, moving the position of the air spring assembly 50 forward or rearward within the apertures 14, 34, or both.

Figure 3B:
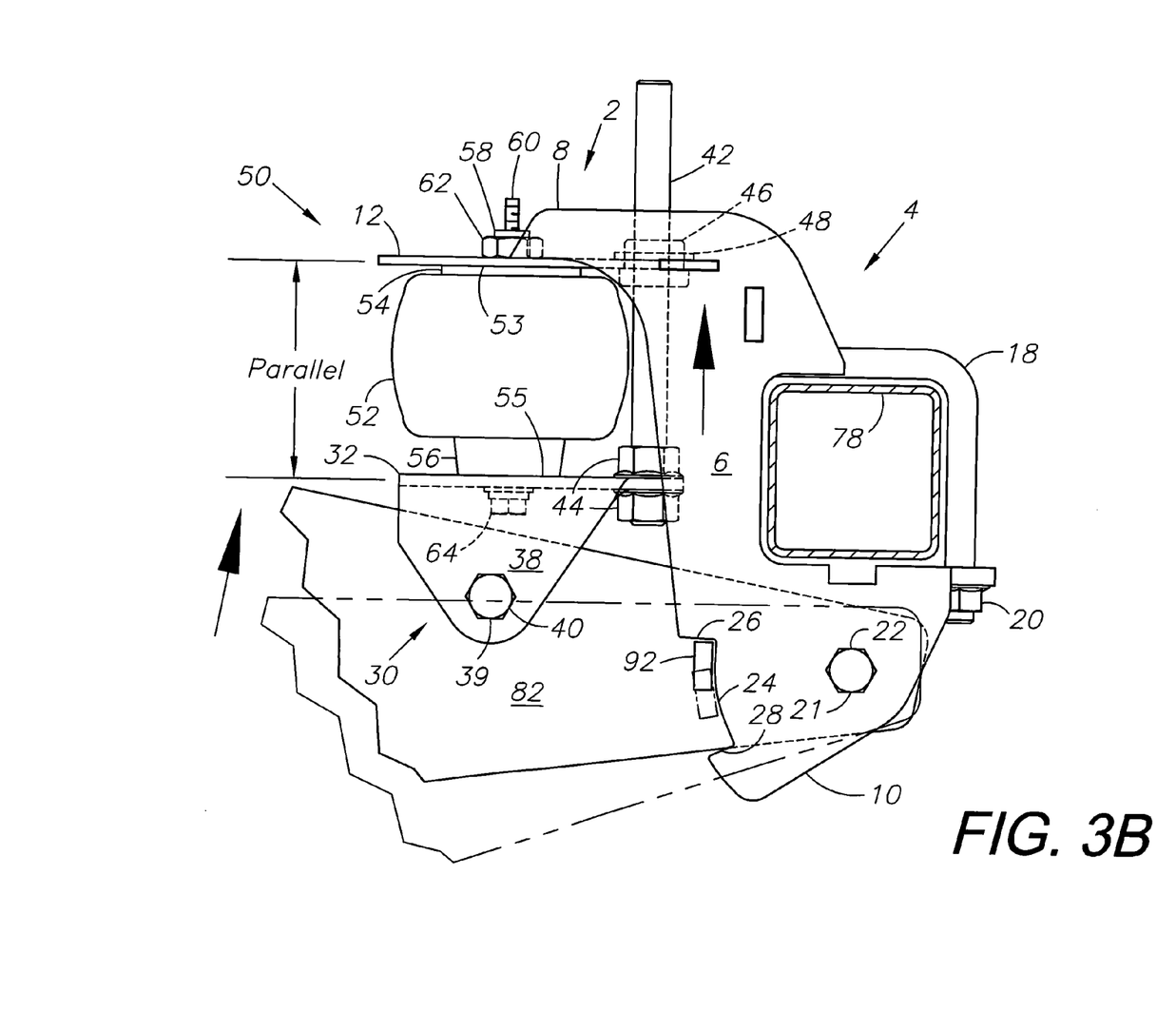
FIG. 3B is an enlarged, fragmentary elevational view of the air spring suspension system taken generally within circle 3A in FIG. 2 and shows the air spring in a compressed condition.
Figure 4A:
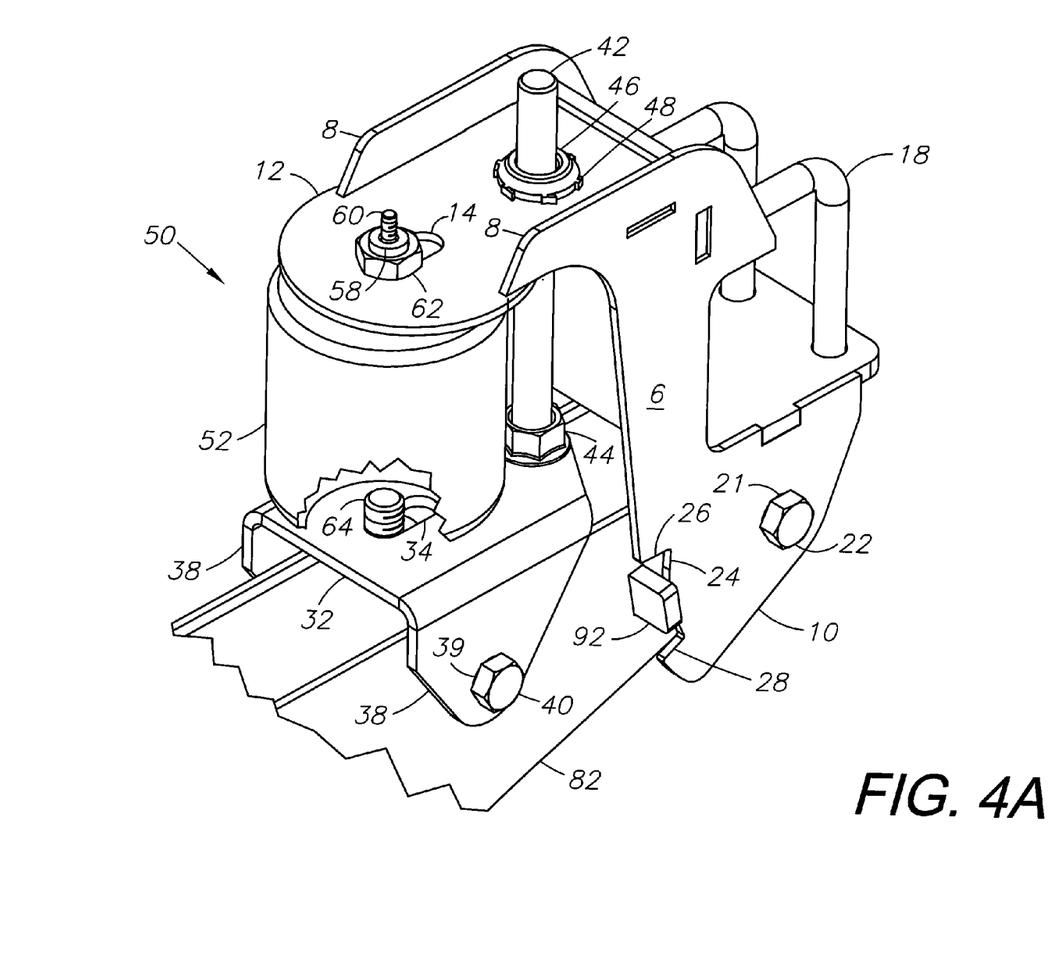
FIG. 4A is a partial, fragmentary left-front perspective view of the air spring suspension system taken generally within circle 4A-B in FIG. 1 and shows the air spring in a rearward position.
Figure 4B:
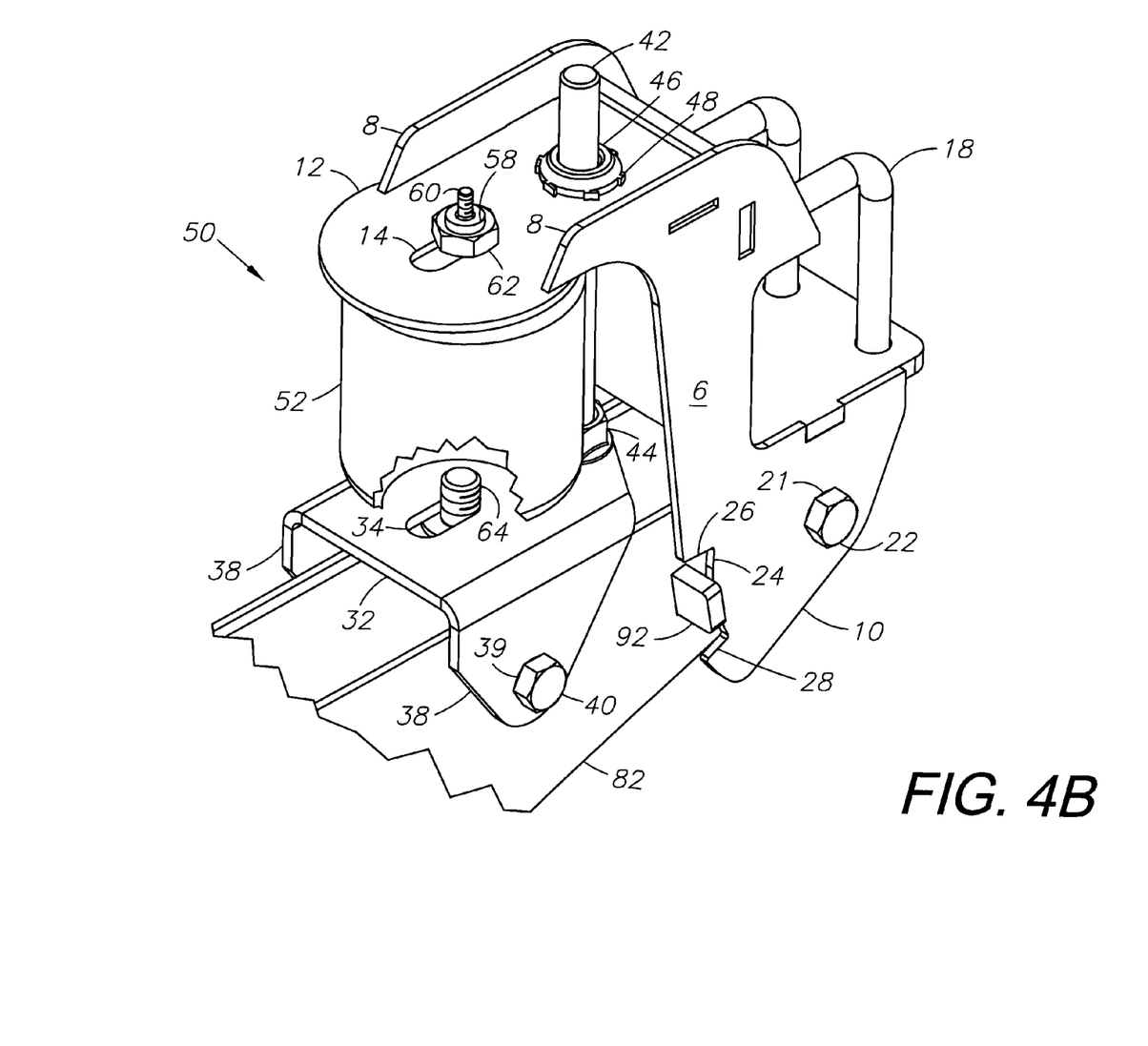
FIG. 4B is a partial, fragmentary left-front perspective view of the air spring suspension system taken generally within circle 4A-B in FIG. 1 and shows the air spring in a forward position.

Referring to FIG. 3A, the suspension system 2 is shown in a neutral position with the air spring assembly 50 located at a forward-most position within the apertures 14, 34 (FIG. 4A-4B). The use of the air spring assembly 50 in conjunction with the guide rod 42 provides two points of alignment for the suspension system 2, thereby positioning the upper plate 12 and the lower plate 32 in a parallel orientation. Referring to FIG. 3B, the suspension system 2 is shown in a maximum compressed position. As the suspension system 2 transitions from a neutral position to a compressed position, the arm 82 of the opener assembly 80 moves up, pivoting about the fastener 22. The guide rod 42 slides up within the wear bushing 46 causing the lower mount 30 to pivot about the fastener 40, in turn maintaining the parallel relationship between the upper and lower plates 12, 32. Constraining the upper and lower plates 12, 32 to a parallel relationship allows the compressing air spring 52 to exert a consistent down pressure throughout compression. The suspension system 2 is prevented from over compression by a tab 92 that contacts an upper stop 26 preventing further upward movement of the opener assembly 80.

Figure 3C:
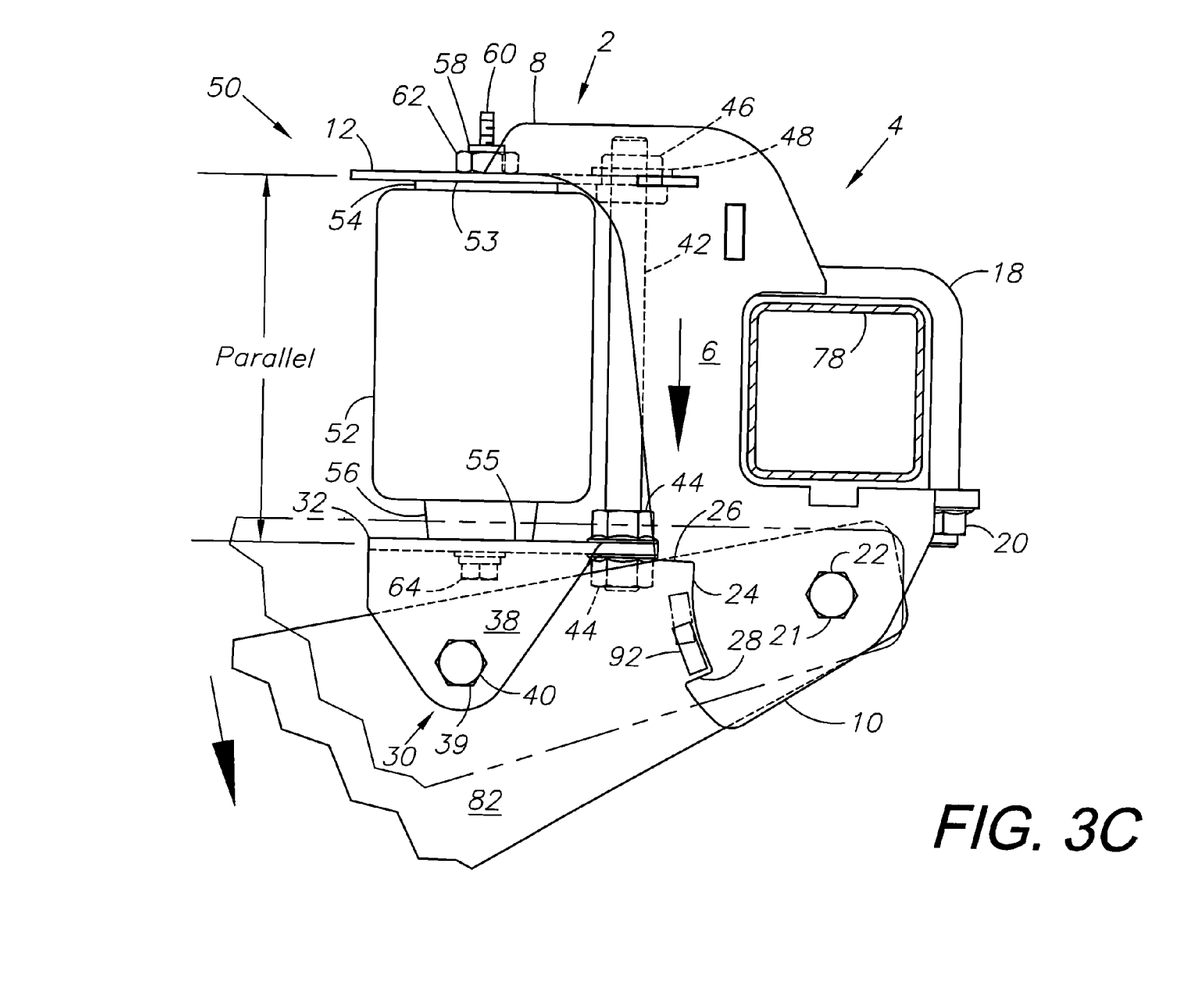
FIG. 3C is an enlarged, fragmentary elevational view of the air spring suspension system taken generally within circle 3A in FIG. 2 and shows the air spring in an extended condition.

Referring to FIG. 3C, the suspension system 2 is shown in a maximum extended position. Again, as the suspension system 2 transitions from a neutral position to an extended position, the guide rod 42 slides down within the wear bushing 46, causing the upper plate and lower plates 12, 32 to remain parallel permitting consistent down pressure by the air spring assembly 50. The suspension system 2 reaches maximum extension when the tab 92 contacts the lower stop 28, preventing further downward movement of the opener assembly 80.

Figure 5:
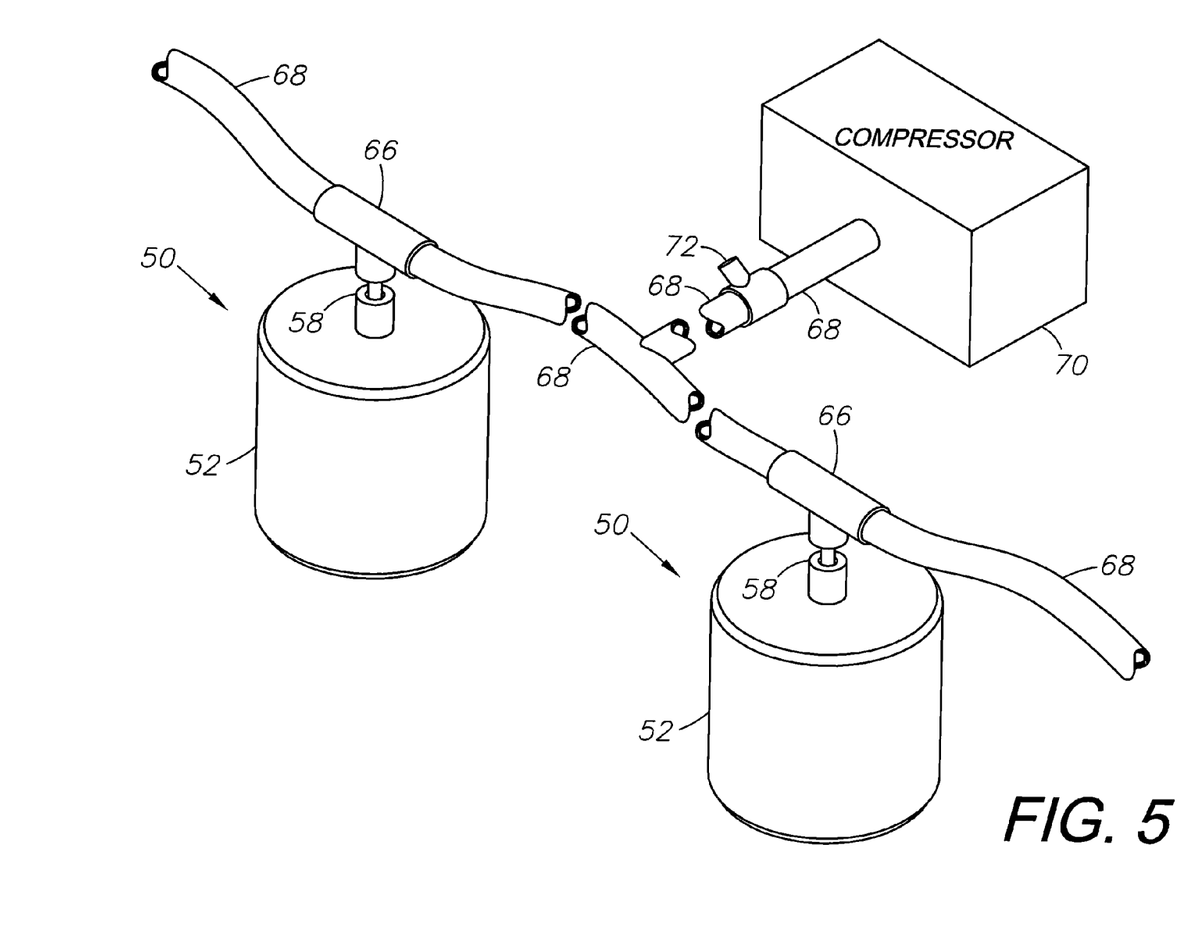
FIG. 5 is an enlarged, fragmentary view showing a pneumatic system connected to the air spring assemblies.

Referring to FIG. 5, the air pressure within the air spring 52 of each air spring assembly 50 can be maintained by an air compressor 70 located at a front end of a tow hitch connected to the tool bar 78. The air compressor 70 can be powered by the tractor electrical system. Multiple air spring assemblies 50 are connected in a series by an air line 68 running between T-fittings 66 attached to the valves 60 of the air spring assemblies 50. The air line 68 also includes an air inlet valve 72 for connection to a compressed air source other than the electrical compressor 70, such as a compressor or an air bottle, whereby the air springs 52 of multiple air spring assemblies 50 can be simultaneously charged up to a desired, common air pressure. Air springs 52 could also be charged to and maintain at different pressures for selective variable down force for accommodating different conditions encountered along the opener implement.

The movement of the air spring assembly 50 between forward and rearward positions within the apertures 14, 34 allows for adjustment of the down pressure exerted by the suspension system 2 because the change in location changes the mechanical advantage of the system 2. The arm 82 of the opener assembly 80 functions as a lever that pivots about a fulcrum located at the fasteners 22 in the legs 10. The air spring assembly 50 operates as a resistive force creating down pressure in response to biasing of the opener assembly 80 against the tool bar 78 due to contact of the opener discs 88 with the ground. When the air pressure in the air spring 52 is constant, and the air spring assembly 50 is positioned forward or rearward within the apertures 14, 34 the amount of down pressure exerted by the suspension system 2 varies. For example, FIG. 4A shows the air spring assembly 50 in a rearward air spring position creating a relatively long distance between the fulcrum and the air spring assembly 50. As a result, the suspension system 2 is capable of relatively high down pressure due to the mechanical advantage caused by the relative positions of the air spring assembly 50 and the fasteners 22. Referring to FIG. 4B, the air spring assembly 50 is shown in a forward air spring position creating a relatively short distance between the fulcrum and the air spring assembly 50, resulting in an increase in mechanical advantage and a decrease in available down pressure.

It will be appreciated that the components of the suspension system 2 can be used for various other applications. Moreover, the suspension system 2 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A pneumatic suspension system for an implement including a ground-working tool movable through a range of motion between raised and lowered positions, which system includes:
    an air spring with first and second ends;
    a first mount connected to said air spring first end and to said implement;
    a second mount connected to said air spring second end and to said implement;
    said first mount is an upper mount being pivotally connected to said implement at a first pivot;
    said second mount is a lower mount being pivotally connected to said implement at a second pivot;
    said lower mount having an elongated aperture receiving said air spring second end, an adjacent hole, and side walls depending therefrom;
    said upper mount having a hole, an adjacent elongated aperture receiving said air spring first end, and legs depending therefrom; and
    a parallel mechanism connected to said first and second air spring mounts and maintaining said air spring first and second ends generally parallel throughout said ground working tool range of motion between its raised and lowered positions.

2. The suspension system of claim 1, which includes:
    said side walls astride said implement and having a hole therethrough, said hole pivotally connecting said lower mount to said implement at a second pivot by a fastener;
    said upper mount legs straddling an end of said implement and having a hole therethrough, said hole pivotally connecting said upper mount to said implement at a first pivot by a fastener.

3. The suspension system of claim 2, wherein:
    said implement having a tab;
    said legs having a recess with upper and lower stops;
    said tab being located between said upper and said lower stops; and
    said implement being rotatable about said first pivot between said upper and said lower stops.

4. The suspension system of claim 2, wherein:
    said parallel mechanism comprises a guide rod having a first and second end, and a tubular nylon plastic bushing;
    said bushing secured within one of said upper or lower mount holes, said guide rod second end being threaded and rigidly secured within said opposite mount hole; and
    said guide rod first end being slidably received within said bushing.

5. The suspension system of claim 2, wherein:
    said air spring is movable within said upper mount elongated aperture and said lower mount elongated aperture.

6. The suspension system of claim 2, wherein:
    said fasteners comprise bolts extending transversely through said implement and secured by a locking nut.

7. The suspension system of claim 3, which includes:
    an air source;
    said air spring valve having a T-fitting communicating therewith;
    an air line communicating with said T-fitting and said air source;
    said air source supplying air to said air spring; and
    said air line having an air inlet valve adapted to receive air from an air source.

8. The suspension system of claim 7, wherein:
    said air source comprises an air compressor or an air charged cylinder.

9. A pneumatic suspension system for an implement including a ground-working tool movably mounted on the implement, said implement being movable through a range of motion between raised and lowered positions, which system includes:
    an air spring with first and second ends, said first end having a valve extending therefrom;
    a first mount connected to said air spring first end and to said implement, said first mount having a hole, and an adjacent elongated aperture receiving said air spring first end;
    a second mount connected to said air spring second end and to said implement, said second mount having a hole, and an adjacent elongated aperture receiving said air spring second end;
    said air spring first and second ends being releasably secured and movable within said upper and said lower mount elongated aperture;
    said first mount being pivotally connected to said implement at a first pivot, said second mount pivotally connected to said implement at a second pivot;

a parallel mechanism comprising a guide rod having a first and second end, and a tubular nylon plastic bushing secured within said first mount hole; and said parallel mechanism maintaining said air spring first and second ends generally parallel through said ground working tool range of motion between its raised and lowered positions.

10. The suspension system of claim 9, wherein:

said lower mount having side walls depending therefrom, said side walls astride said implement and having holes therethrough, said holes receiving a fastener for pivotally connecting said lower mount to said implement at said second pivot;

said upper mount having legs straddling an end of said implement, said legs having holes therethrough, said holes receiving a fastener for connecting said upper mount to said implement at said first pivot.

11. The suspension system of claim 10, wherein:

said implement having a tab;

said legs having a recess with upper and lower stops;

said tab being located between said upper and lower stops; and said implement being rotatable about said first pivot between said upper and said lower stops.

12. The suspension system of claim 11, wherein:

said fasteners comprise bolts extending transversely through said implement and secured by a locking nut.

13. The suspension system of claim 11, which includes:

an air source;

said air spring valve having a T-fitting communicating therewith;

an air line communicating with said T-fitting and said air source;

said air source supplying air to said air spring; and said air line having an air inlet valve adapted to receive air from an air source.

14. The suspension system of claim 13, wherein:

said air source comprises an air compressor or an air charged cylinder.

15. A pneumatic suspension system for an agricultural implement, comprising:

said agricultural implement including a rearwardly extending arm, a pair of opener discs rotatably mounted on said arm for working the soil as said implement is pulled behind a farm tractor, a press wheel connected to the rear of the arm by a trailing arm for adjusting the depth of said discs and for compacting the soil;

said agricultural implement movable between raised and lowered positions;

said suspension system including an air spring assembly disposed between a first mount and a second mount, and a parallel plate mechanism maintaining said first and lower mounts generally parallel;

said first mount including an upper plate fixedly secured to a bracket, said upper plate having a hole and an adjacent elongated aperture, said upper mount having legs depending therefrom, said legs straddling and being pivotally attached at a first pivot by a fastener to one of the implement and the arm;

said second mount including a lower plate, said lower plate having a hole and an adjacent elongated aperture, said lower plate having side walls depending therefrom, said side walls astride and being pivotally attached at a second pivot by a fastener to the other of the implement and the arm;

said air spring assembly including an air spring having first and second ends, said air spring first end having a valve extending thereform and being connected to said upper plate within said elongated aperture, and said air spring second end being connected to said lower plate within said elongated aperture, said air spring first and second ends movable within said apertures;

said air spring having a compressed configuration with said arm in its raised position and an extended configuration with said arm in its lowered position;

said parallel plate mechanism connected to said upper and lower plates and maintaining said plates generally parallel as said arm moves between raised and lowered positions;

said parallel plate mechanism comprising a guide rod having first and second ends, and a nylon plastic tubular bushing;

said bushing secured within said upper plate hole by a ring nut; and said guide rod second end being threaded and rigidly secured within said lower plate hole by opposing locking nuts, and said guide rod first end being slidably received within said bushing.

16. The pneumatic suspension system of claim 15, which includes:

an air source;

said air spring valve having a T-fitting communicating therewith;

an air line communicating with said T-fitting and said air source;

said air source supplying air to said air spring; and said air line having an air inlet valve adapted to receive air from an air source.

17. The pneumatic suspension system of claim 16, wherein:

said air source comprises an electrical air compressor or an air charged cylinder.

18. A pneumatic suspension system for an implement including a ground-working tool movable through a range of motion between raised and lowered positions, which system includes:

an air spring with first and second ends;

a first mount connected to said air spring first end and to said implement;

a second mount connected to said air spring second end and to said implement;

said first mount is an upper mount being pivotally connected to said implement at a first pivot;

said second mount is a lower mount being pivotally connected to said implement at a second pivot;

said lower mount having an elongated aperture receiving said air spring second end, an adjacent hole, and side walls depending therefrom;

said side walls astride said implement and having a hole therethrough, said hole pivotally connecting said lower mount to said implement at a second pivot by a fastener;

said upper mount having a hole, an adjacent elongated aperture receiving said air spring first end, and legs depending therefrom;

said upper mount legs straddling an end of said implement and having a hole therethrough, said hole pivotally connecting said upper mount to said implement at a first pivot by a fastener; and a parallel mechanism connected to said first and second air spring mounts and maintaining said air spring first and second ends generally parallel throughout said ground working tool range of motion between its raised and lowered positions.

* * * * *